United States Patent
Bauch et al.

(10) Patent No.: US 12,014,551 B2
(45) Date of Patent: Jun. 18, 2024

(54) METHOD, DEVICE, COMPUTER PROGRAM AND COMPUTER PROGRAM PRODUCT FOR PROVIDING A TRAJECTORY OF AN OBJECT FOR A VEHICLE

(71) Applicant: Bayerische Motoren Werke Aktiengesellschaft, Munich (DE)

(72) Inventors: Dominik Bauch, Muehldorf am Inn (DE); Josef Mehringer, Gmund (DE); Daniel Meissner, Friedberg (DE); Marco Baumgartl, Gilching (DE); Michael Himmelsbach, Munich (DE); Luca Trentinaglia, Eichenau (EC)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 387 days.

(21) Appl. No.: 17/423,944

(22) PCT Filed: Oct. 18, 2019

(86) PCT No.: PCT/EP2019/078422
§ 371 (c)(1),
(2) Date: Jul. 19, 2021

(87) PCT Pub. No.: WO2020/160794
PCT Pub. Date: Aug. 13, 2020

(65) Prior Publication Data
US 2022/0092316 A1    Mar. 24, 2022

(30) Foreign Application Priority Data
Feb. 4, 2019   (DE) ..................... 10 2019 102 679.2

(51) Int. Cl.
*G06V 20/56*        (2022.01)
*G06T 7/277*        (2017.01)

(52) U.S. Cl.
CPC .............. *G06V 20/56* (2022.01); *G06T 7/277* (2017.01)

(58) Field of Classification Search
CPC ..... G06V 20/56; G06T 7/277; G06F 2218/12; G06F 18/00
See application file for complete search history.

(56) References Cited

U.S. PATENT DOCUMENTS

| 8,179,281 | B2 | 5/2012 | Strauss |
| 10,663,966 | B2 * | 5/2020 | Wang ....................... B62D 1/00 |

(Continued)

FOREIGN PATENT DOCUMENTS

| CN | 102358287 A | 2/2012 |
| CN | 107608344 A | 1/2018 |

(Continued)

OTHER PUBLICATIONS

Skolaut, W. (Publisher): Maschinenbau—Ein Lehrbuch für das ganze Bachelor-Studium. Berlin: Springer, 2014, pp. 176-177, ISBN 978-3-8274-2554-6.

*Primary Examiner* — Matthew C Bella
*Assistant Examiner* — Pardis Sohraby
(74) *Attorney, Agent, or Firm* — 2SPL Patent Attorneys PartG mbB; Yong Beom Hwang

(57) ABSTRACT

In the method, a predetermined first number of sensed positions (Pi) of the object (20) are provided, the positions being provided with respect to a vehicle coordinate system (K) of the vehicle (10). Depending on a predetermined second number of the provided positions, a second coordinate system (K') is determined. The provided positions are transformed into the second coordinate system (K') and a function is determined which approximates a course of the provided positions in the second coordinate system (K'). For a predetermined third number of sampling points of the function, at least one analytical property of the function is (Continued)

determined at the respective sampling point. The coordinates and the at least one analytical property of the respective sampling point are transformed into the vehicle coordinate system (K).

12 Claims, 7 Drawing Sheets

(56) References Cited

U.S. PATENT DOCUMENTS

| | | | |
|---|---|---|---|
| 2012/0303258 A1* | 11/2012 | Pampus | B62D 15/0285 |
| | | | 701/300 |
| 2018/0032080 A1 | 2/2018 | Oska et al. | |
| 2020/0377084 A1* | 12/2020 | Ondruska | G01C 21/3647 |
| 2021/0302534 A1* | 9/2021 | Kellner | G01S 7/403 |
| 2022/0009551 A1* | 1/2022 | Reith | B62D 15/025 |

FOREIGN PATENT DOCUMENTS

| | | | |
|---|---|---|---|
| CN | 107672591 A | 2/2018 | |
| CN | 108528442 A | 9/2018 | |
| DE | 3407035 C1 | 4/1992 | |
| DE | 102006036363 A1 | 4/2007 | |
| DE | 102006040334 A1 | 3/2008 | |
| DE | 102008002602 A1 * | 12/2009 | B60W 30/16 |
| DE | 102014200987 A1 | 7/2015 | |
| DE | 102015013085 A1 | 3/2016 | |
| DE | 102014223000 A1 | 5/2016 | |
| DE | 102017011982 A1 * | 5/2018 | |
| EP | 3364211 A1 | 8/2018 | |

\* cited by examiner

METHOD, DEVICE, COMPUTER PROGRAM AND COMPUTER PROGRAM PRODUCT FOR PROVIDING A TRAJECTORY OF AN OBJECT FOR A VEHICLE

CROSS-REFERENCE TO RELATED APPLICATIONS

This application is a 35 U.S.C. § 371(c) national stage entry of PCT/EP2019/078422, filed on Oct. 18, 2019. That application claimed priority to German Application 10 2019 102 679.2 filed on Feb. 4, 2019. The contents of the earlier filed applications are incorporated by reference herein in their entirety.

FIELD

The invention relates to a method for providing a trajectory of an object for a vehicle, in particular for an autonomously and semi-autonomously guided vehicle. The invention further relates to a device for providing a trajectory of an object to a vehicle. The invention further relates to a computer program and a computer program product for providing a trajectory of an object to a vehicle.

Due to limited memory and computational capacities, road courses and travelled paths of the own vehicle (ego-vehicle) and of third-party vehicles are partly or modelled by mathematical functions in sections or segments for autonomously or semi-autonomously driven vehicles. The courses of the trams and the travelled paths are predominantly described in a vehicle-rigid coordinate system, for example in a vehicle coordinate system according to DIN ISO-8855. Thus, road courses and trajectories or paths of foreign or third-party vehicles, which run approximately or almost parallel to the trajectory of the own vehicle (ego trajectory), may be described very efficiently with respect to a memory and computational effort.

The object underlying the invention is to provide a method, a device, a computer program, and a computer program product that enable efficient provision of trajectories of objects for a wide variety of traffic scenes.

The task is solved by the features of the independent patent claims. Advantageous further embodiments of the invention are indicated in the subclaims.

According to a first aspect, the invention is characterized by a method of providing a trajectory of an object for a vehicle. The invention is further characterized by an apparatus or device, wherein the device is configured to perform the method of providing the trajectory of the object to the vehicle.

SUMMARY

In the method, a predetermined first number of sensed positions of the object are provided, the positions being provided with respect to a vehicle coordinate system of the vehicle. Depending on a predetermined second number of the provided positions, a second coordinate system is determined. The provided positions are transformed into the second coordinate system and a function is determined which approximates a course of the provided positions in the second coordinate system. For a predetermined third number of sampling or scan or acquisition points of the function, at least one analytical property of the function is determined at the respective sampling point. The coordinates and the at least one analytical property of the respective sampling point are transformed into the vehicle coordinate system.

The first, second and/or third numbers may be the same or different.

The object is preferably an object that moves. In particular, the object may be a third-party vehicle. The object is located in a predefined environment of the vehicle at the time the positions are sensed or detected.

The function to be determined, which approximates the course of the provided positions in the second coordinate system, is preferably an explicit function, for example according to the assignment y=f(x).

A vehicle coordinate system is a three-dimensional cartesian coordinate system with respect to which the vehicle is at rest. For example, it is a coordinate system specified in the DIN standard ISO 8855. Such a coordinate system is also called an ego-centered coordinate system or ego coordinate system. The method is also applicable for a three-dimensional case. In the following, however, two-dimensional applications are assumed, e.g. z=o in the coordinate system specified in the DIN standard ISO 8855.

The sensed positions are each characterized by position data values. The sensed positions describe a path of the object, which may be used for a trajectory. A trajectory describes a course of state (for example, position, orientation, velocity and acceleration vectors, et cetera) over time on which an object, in particular a vehicle, may be controlled using driving maneuvers. A trajectory or path is usually a one-dimensional submanifold in a multidimensional space. The trajectory may extend along a driving surface, such as a road, to be traveled by the vehicle. The trajectory describes where the vehicle is positioned at which time or where it will be in the future.

The second coordinate system is additionally determined so that the vehicle uses at least two coordinate systems. The second coordinate system is preferably determined such that the trajectory of the sensed position data with respect to the second coordinate system may be described by a single explicit function of a variable.

Preferably, the coordinates transformed into the vehicle coordinate system and the at least one analytical property are provided at a predetermined interface. For example, these are stored in a predetermined memory area and subsequently used for different control functions of the ego-vehicle. A possible application example is the control of a deceleration in case of cross traffic.

The method described above makes it possible to advantageously extend system limits of current assistance and safety functions and to model and reconstruct trajectories in general traffic scenes using similar resource-saving estimation methods, where a representation of the trajectory by an explicit mathematical function in a vehicle-related coordinate system is not possible. Scenes where it is not possible to represent the trajectory by an explicit function of a variable in the vehicle coordinate system include, for example:

Objects moving transverse to the direction of travel of the ego vehicle,

Objects passing through a roundabout and

Objects turning at an intersection or generally changing direction on a tight curve.

By means of the method described above, it is possible to determine and/or estimate analytical quantities or analytical properties, such as tangential angle and/or curvature, even for paths that have been travelled or covered and for which it is not possible to represent the course of the path by an explicit function of a variable in the vehicle coordinate system.

In addition, this extension of the previously known modeling and estimation procedure increases the resource requirements only insignificantly. Integration on control devices with severely limited storage and computing capacities is possible.

In an optional embodiment according to the first aspect, the sensed positions are stored in a ring buffer. The ring buffer has a memory array with a fixed size. Here, an input pointer points to the first free element in the memory array representing the ring buffer, and an output pointer points to the first occupied element in the memory array. Unlike the conventional memory array, the oldest contents are overwritten when the buffer is full and more elements are placed in the ring buffer. This has the advantage that an access to the first number of acquired positions, each of which is evaluated, may be done easily and efficiently by iteration.

In another optional embodiment according to the first aspect, positions detected in direct succession comprise a minimum spacing. This makes it possible to keep memory requirements low while at the same time ensuring that even strong changes in the trajectory are mapped with sufficient accuracy.

In a further optional embodiment according to the first aspect, the minimum distance between the directly successively detected positions is dependent on a current speed of the vehicle and/or a current yaw angle of the object and/or a curvature determined for the current position of the object of a previously determined trajectory comprising the current position of the object. The respective distance of the detected positions may therefore be different. Advantageously, it may be ensured that the course of the trajectory may be approximated sufficiently accurately by a third-degree polynomial.

In a further optional embodiment according to the first aspect, the second coordinate system is determined depending on a factor $\lambda$ representative of a quotient of an actual distance between the two temporally last detected positions of the all in all third number of detected positions and the minimum distance. Preferably, the factor $\lambda$ is equal to the quotient. This makes it possible to determine the second coordinate system with little computational effort and to ensure a continuous displacement of the additional coordinate system.

In another optional embodiment according to the first aspect, the course of the provided positions in the second coordinate system is approximated by a polynomial having a degree of at least three. This allows a sufficiently accurate and efficient determination of the analytical quantities at different points of the trajectory curve.

In a further optional embodiment according to the first aspect, respective polynomial coefficients of the polynomial are determined using Kalman filtering. This allows a sufficiently accurate and efficient estimation of the polynomial coefficients.

In a further optional embodiment according to the first aspect, the points of the function corresponding to the first sensed position and to the last sensed position form an end point and a starting point, respectively, of a portion of a trajectory of the function representing the course of the provided positions in the second coordinate system. The section is divided into a predetermined fourth number of sampling points characterized by their arc length. A tangential angle and/or a curvature and/or a change in curvature is determined for the respective sampling point as the at least one analytical property of the function. Advantageously, these analytical properties may be used to characterize a trajectory of the object in the vehicle coordinate system that describes the actual trajectory of the object with sufficient accuracy.

In a further optional embodiment according to the first aspect, for a predetermined fifth number of sampling points, a respective data set is provided comprising the coordinates of the sampling point with respect to the vehicle coordinate system and the at least one analytical property transformed into the vehicle coordinate system.

The first, second, third, fourth and/or fifth numbers may each be the same or different.

According to a further aspect, the invention is characterized by a computer program, wherein the computer program is configured to execute the method of the first aspect.

According to a further aspect, the invention is characterized by a computer program product comprising executable program code, wherein the program code, when executed by a data processing device, executes the method of the first aspect.

Optional embodiments of the first aspect also apply to the further aspects.

In particular, the computer program product comprises a medium readable by the data processing device on which the program code is stored.

The computer program may run on a central data processing device or on a decentralised data processing device.

It is noted that some of the possible features and advantages of the invention are described herein with reference to various embodiments. A person skilled in the art will recognize that the features of the method and device may be suitably combined, adapted or interchanged to arrive at further embodiments of the invention.

BRIEF DESCRIPTION OF THE FIGURES

Embodiments of the invention are explained below with reference to the schematic drawings, in which.

DETAILED DESCRIPTION

Elements of the same construction or function are provided with the same reference signs across all Figures.

Figure 1A:
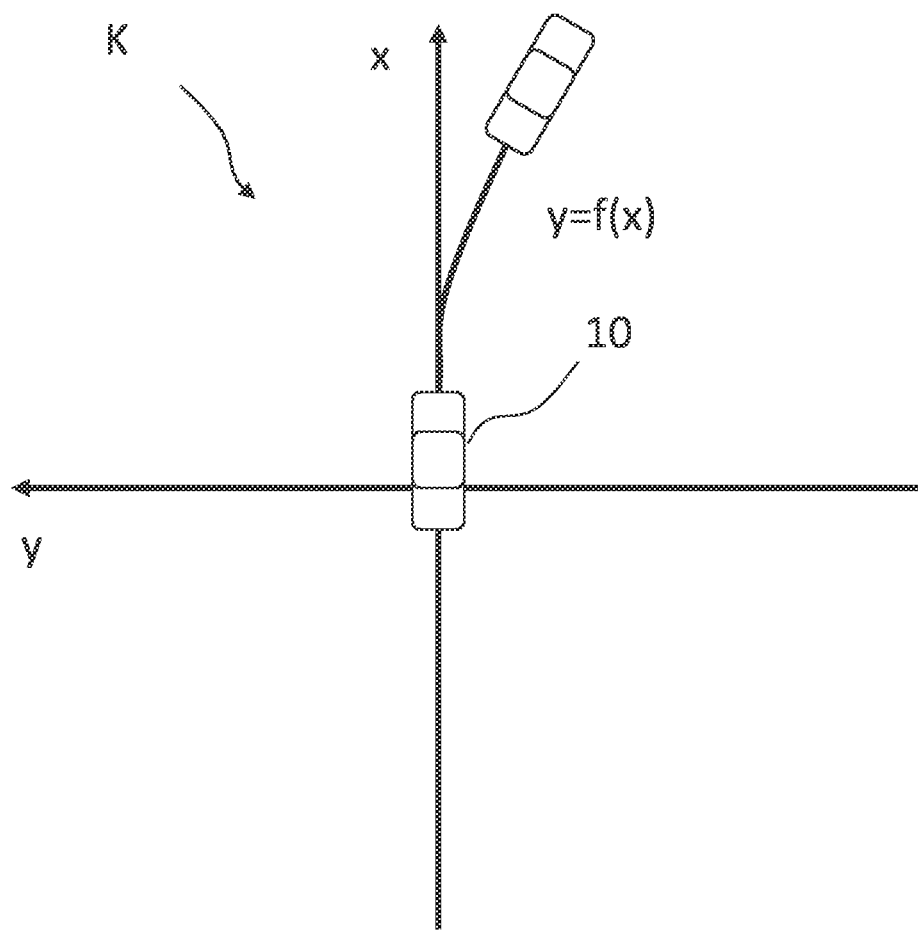
FIG. 1a shows an example trajectory of a vehicle.

FIG. 1a shows an exemplary trajectory of a first vehicle 10, hereinafter referred to as an ego vehicle.

The course of the trajectory may be described in terms of the ego vehicle coordinate system K as a function $y=f(x)$. For example, a polynomial with a degree of at least three is used to represent the graph.

Figure 1B:
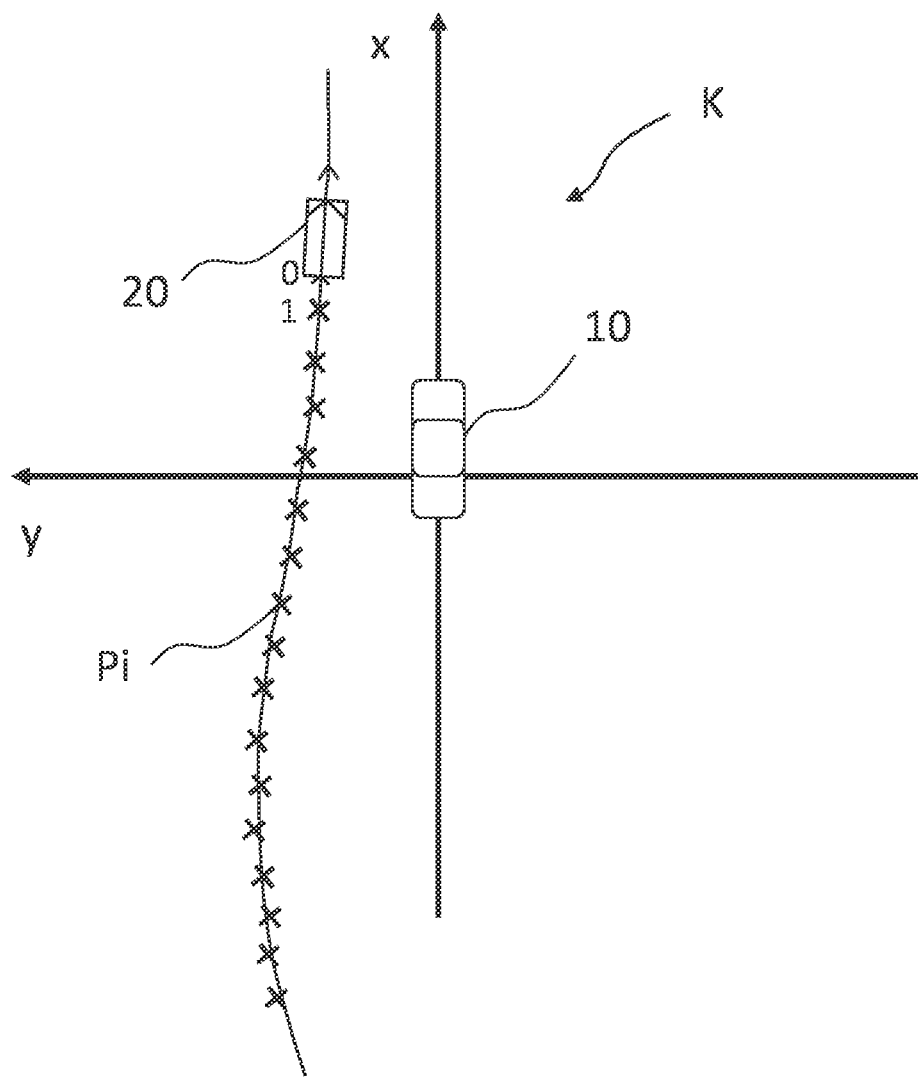
FIG. 1b shows an exemplary trajectory course of a third-party vehicle.

FIG. 1b shows an exemplary course of a trajectory of an object 20, for example a third-party vehicle, which is located in a neighborhood of the ego vehicle.

Figure 1C:
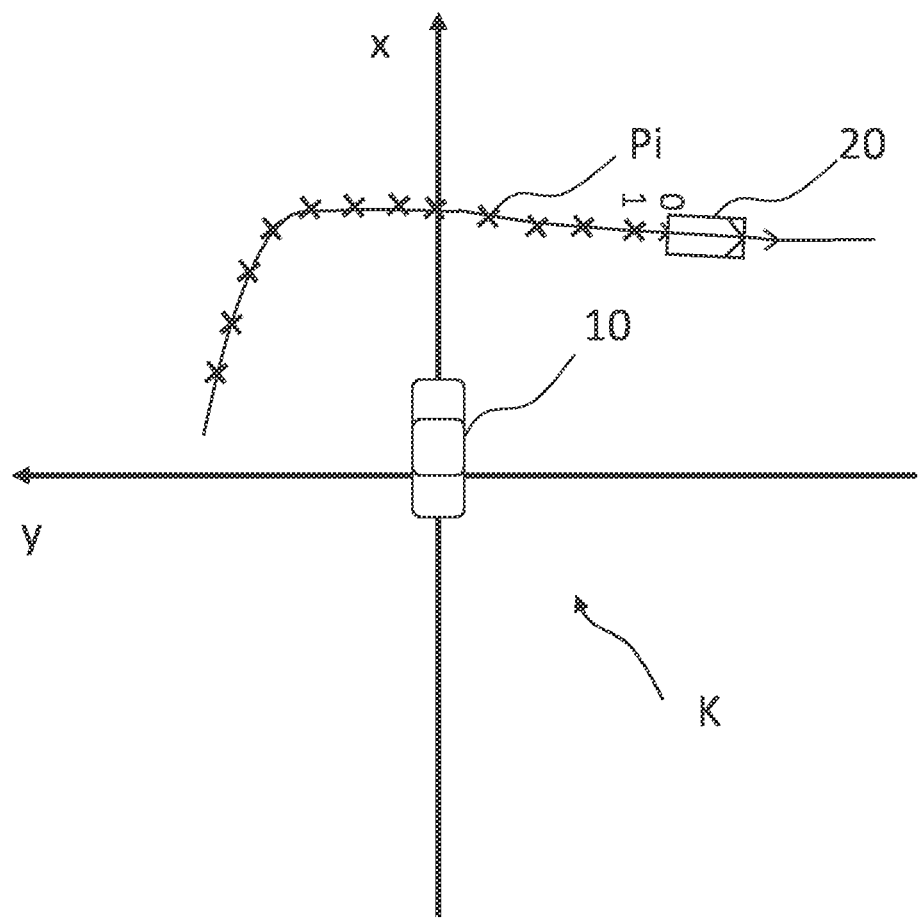
FIG. 1c shows another exemplary trajectory course of a third-party vehicle.

FIG. 1c shows another exemplary course of a trajectory of an object 20, for example a third-party vehicle, which is located in a neighborhood of the ego vehicle. The trajectory has such a strong curvature that the course of the trajectory cannot be represented by an explicit function with respect to the vehicle coordinate system K of the ego-vehicle 10.

Figure 2:
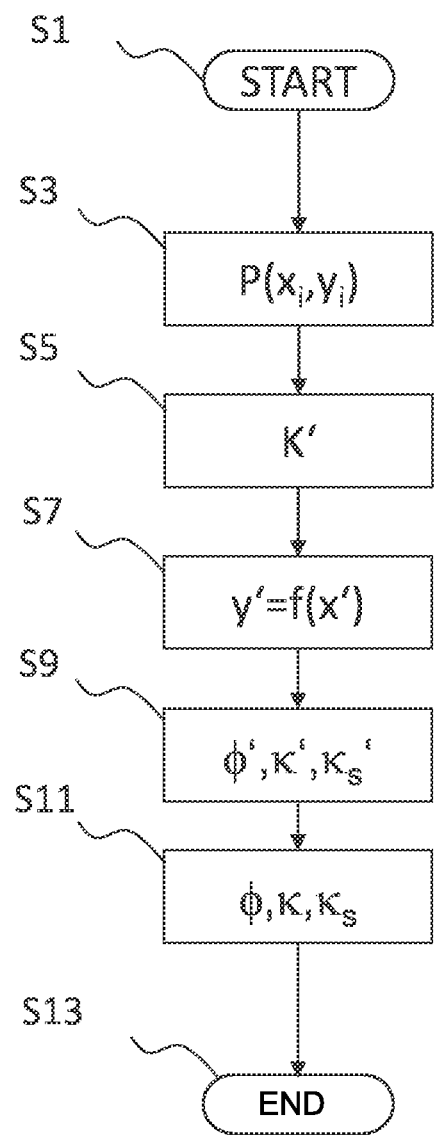
FIG. 2 shows an exemplary flow chart for a program for providing a trajectory course of an object for a vehicle.

FIG. 2 shows an exemplary program for providing a trajectory of an object 20 for the vehicle 10.

The program may be executed by a device. For example, the device is implemented in a control device of the vehicle 10.

The device may also be referred to as a device for providing a trajectory of an object 20 for the vehicle 10.

For this purpose, the device comprises, in particular, a computing unit, a program and data memory, and, for example, one or more communication interfaces. The program and data memory and/or the computing unit and/or the communication interfaces may be formed in one unit and/or distributed across several units.

In particular, a program for providing a trajectory of an object for a vehicle is stored on the program and data memory of the device for this purpose.

The program is started in a step S1, in which variables may be initialized if necessary.

In a step S3 a predetermined first number of sensed positions Pi of the object 20 of the vehicle 10 are provided, the positions being provided with respect to a vehicle coordinate system K of the vehicle 10.

For example, the positions of the object 20 are detected by a sensor, such as a lidar sensor. The sensor may be part of the device or may be configured as a separate unit. The object 20 is located in a predefined environment of the vehicle 10 at the time the positions are sensed. The predetermined environment may, for example, be determined by a range of the lidar sensor and thus be predetermined. The lidar sensor is configured, for example, to forward or transfer the sensed positions Pi to the program.

The sensed position data Pi is stored in a ring buffer, for example.

Figure 3A:
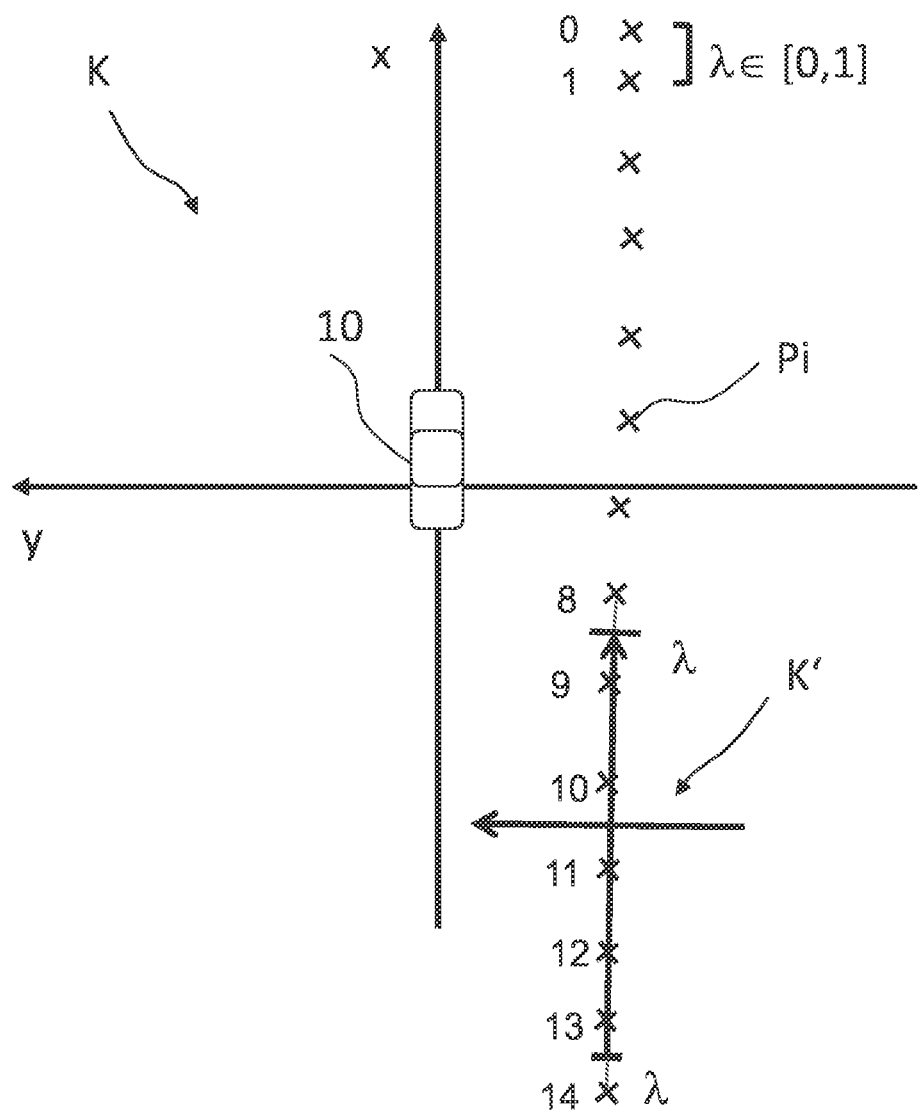
FIG. 3a shows an exemplary sequence of sensed positions for a third-party vehicle in relation to a second coordinate system.

FIG. 3a shows a series of sensed positions Pi of an object 20, for example a third-party vehicle. A currently sensed position Pi is at a foremost position in the series of successively sensed positions Pi of the object 20 in time.

For example, the first number of sensed positions Pi is in a range from 20 to 30 positions. For example, 25 positions each are stored and evaluated in the ring buffer. The limitation of the first number of sensed positions Pi is mainly due to the available memory and/or computing capacity.

Whenever there is a predetermined minimum distance between the current position of the object 20 and the last measurement in time that was pushed into the ring buffer, this current position is stored as a further position in the ring buffer.

The minimum distance between the positions Pi sensed in direct succession is for example dependent on a current speed of the vehicle 10 and/or a current yaw angle of the object 20 and/or a curvature, determined for the current position of the object 20, of a previously determined trajectory which comprises the current position of the object 20.

Thus, the distance between the sensed positions Pi is often different.

In a step S5 (FIG. 2) a second coordinate system K' is determined depending on a predetermined second number of provided positions. The second coordinate system K' has, for example, a first axis x' and a second axis y' which are perpendicular to each other. The determination of the second coordinate system K' is explained in more detail using FIG. 3a as an example.

For example, the second coordinate system K' is determined depending on four sensed positions Pi, which are also referred to as waypoints in the following. It is advantageous to determine the second coordinate system K' depending on four or more waypoints.

An origin of the second coordinate system K' is preferably selected in a middle section of the trajectory course. For example, when the first number of waypoints is 25, the origin of the second coordinate system K' is placed near the eleventh waypoint.

For example, the first axis x' is chosen to include a vector $\vec{ab}$ pointing from a point A to a point B. For example, an origin of the second coordinate system K' is described by the following vector equation:

$$(0,0)' = \vec{a} + 0.5 * \vec{ab} \qquad \text{Eq. (1)}$$

wherein for the vector $\vec{a}$ the following applies:

$$\vec{a} = \vec{c} + \lambda * \vec{d} \qquad \text{Eq. (2)}$$

$$\vec{b} = \vec{e} + \lambda * \vec{f} \qquad \text{Eq. (3)}$$

wherein λ is a factor representative of a quotient of an actual distance between the two temporally most recently detected positions (indicated by the numbers 0 and 1 in FIG. 3a) from the all in all third number of detected positions Pi and the minimum distance. The factor λ is preferably equal to the quotient of the actual distance between the temporally two last detected positions Pi of the all in all third number of detected positions Pi and the minimum distance.

The factor λ indicates how "close" it is to being stored again in the ring buffer. If λ=1, the minimum distance is fulfilled and a new waypoint is stored in the ring buffer. If λ=0, the distance between waypoint n and waypoint n+1 is zero, i.e. a waypoint has only just been deposited. The factor λ is used for the choice of the second coordinate system K' to ensure that a single entry in the ring buffer (which shifts the indices of the buffered measurements) does not lead to large jumps in the choice of coordinate system.

The vectors $\vec{c}$, $\vec{d}$, $\vec{e}$ and $\vec{f}$ point from the origin of the vehicle coordinate system K to the respective kth waypoints $$k1 = \min(WP-1, 14) \qquad \text{Eq. (4)}$$

$$k2 = k1-1 \qquad \text{Eq. (5)}$$

$$k3 = \max(k1-5, 1) \qquad \text{Eq. (6)}$$

$$k4 = \max(k1-6, 0) \qquad \text{Eq. (7)}$$

wherein WP is the first number of waypoints.

This means that if 25 waypoints are selected, the fourteenth waypoint, the thirteenth waypoint, the ninth waypoint, and the eighth waypoint will be used.

The second coordinate system K' is characterized with respect to the vehicle coordinate system K by its origin ($x_0$, $y_0$) and its angle of rotation β, which is enclosed by the x-axis of the vehicle coordinate system K and the first axis x' of the second coordinate system K'.

Using the algorithm described above to determine the second coordinate system K' has the advantage that, with a high degree of probability, the selected second coordinate system K' is approximately tangential to the central section of the trajectory curve to be modeled. This makes it possible to approximate even very dynamic maneuvers, such as the turning of a third-party vehicle, with sufficient accuracy using a third-degree polynomial.

The determination of the second coordinate system K' may also be done in a different way.

Figure 3B:
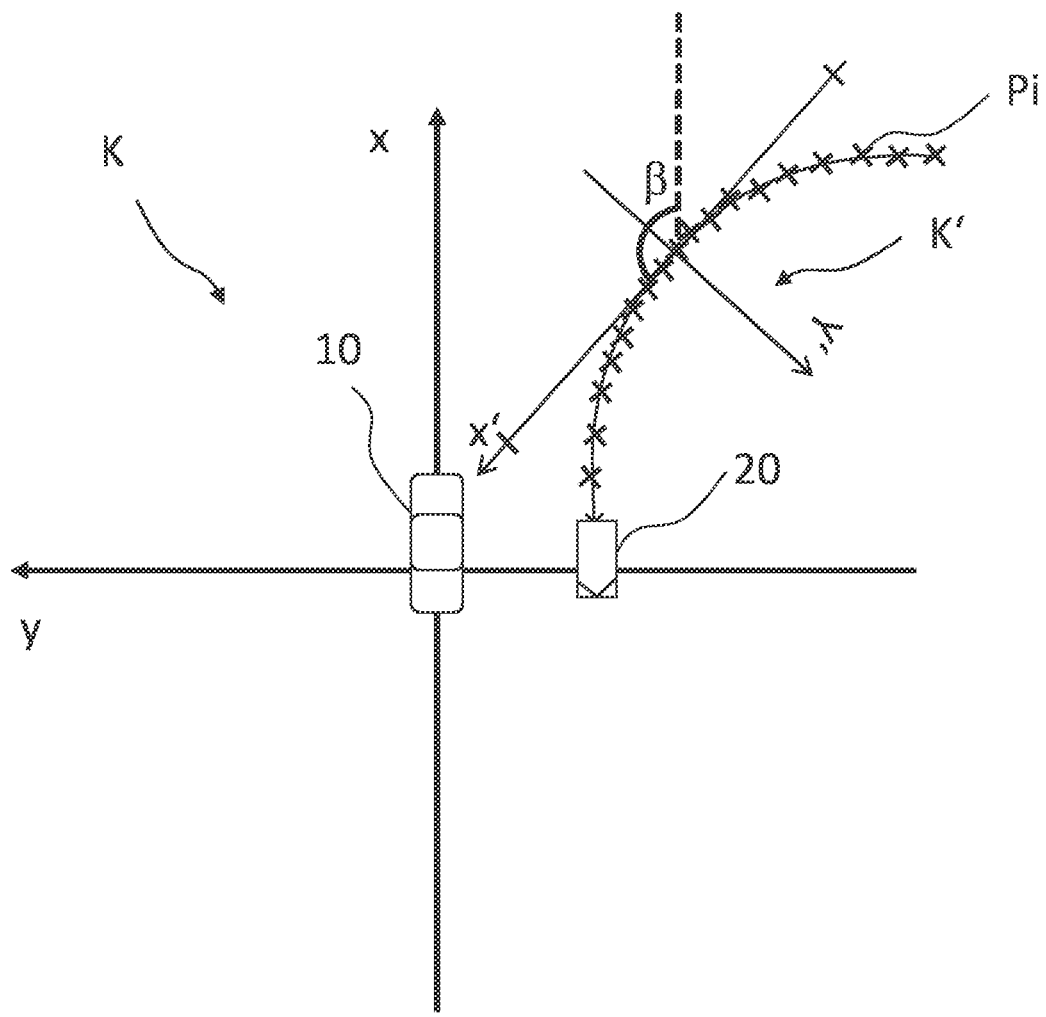
FIG. 3b shows a further exemplary trajectory course of the third-party vehicle in relation to a further second coordinate system and FIG. 3c shows a division of a further trajectory course derived from the further trajectory course into sections for a reverse transformation.

In a step S7 (FIG. 2) the provided positions are transformed into the second coordinate system K' so that their coordinates refer to the second coordinate system K'. Furthermore, a function is determined which approximates a trajectory of the provided positions in the second coordinate system K'. FIG. 3b shows a corresponding trajectory for another traffic scene.

For example, the function includes a third degree polynomial. The degree of the polynomial may also be chosen differently, in particular higher, according to the accuracy requirements. For example, a linear regression is performed to determine the polynomial coefficients. For example, the polynomial coefficients are estimated using least squares approximations describing the shape in K' of a path segment representing the trajectory path of the object 20.

If a least squares algorithm is used that requires an initial state, the resulting polynomial of a previous cycle (with approximations) may be converted into the coordinate system K'.

The first and last waypoints are used to determine the coordinates of an endpoint E and a starting point A, respectively, of a section of the trajectory of the function modeling the trajectory, with respect to the first axis x' of the second coordinate system K'.

Thus, for each object 20 detected in a given time interval, a second coordinate system K' representing the respective polynomial may be determined and the polynomial coefficients, for example a0, a1, a2, a3, . . . , of the estimated polynomial may be determined, as well as the coordinates xs', xe' of the first axis x' of the respective second coordinate system K' defining the ends of the section under consideration.

In a step S9 (FIG. 2), at least one analytical property of the function at the respective sampling point is determined for a predetermined third number of sampling points AP of the function.

Figure 3C:
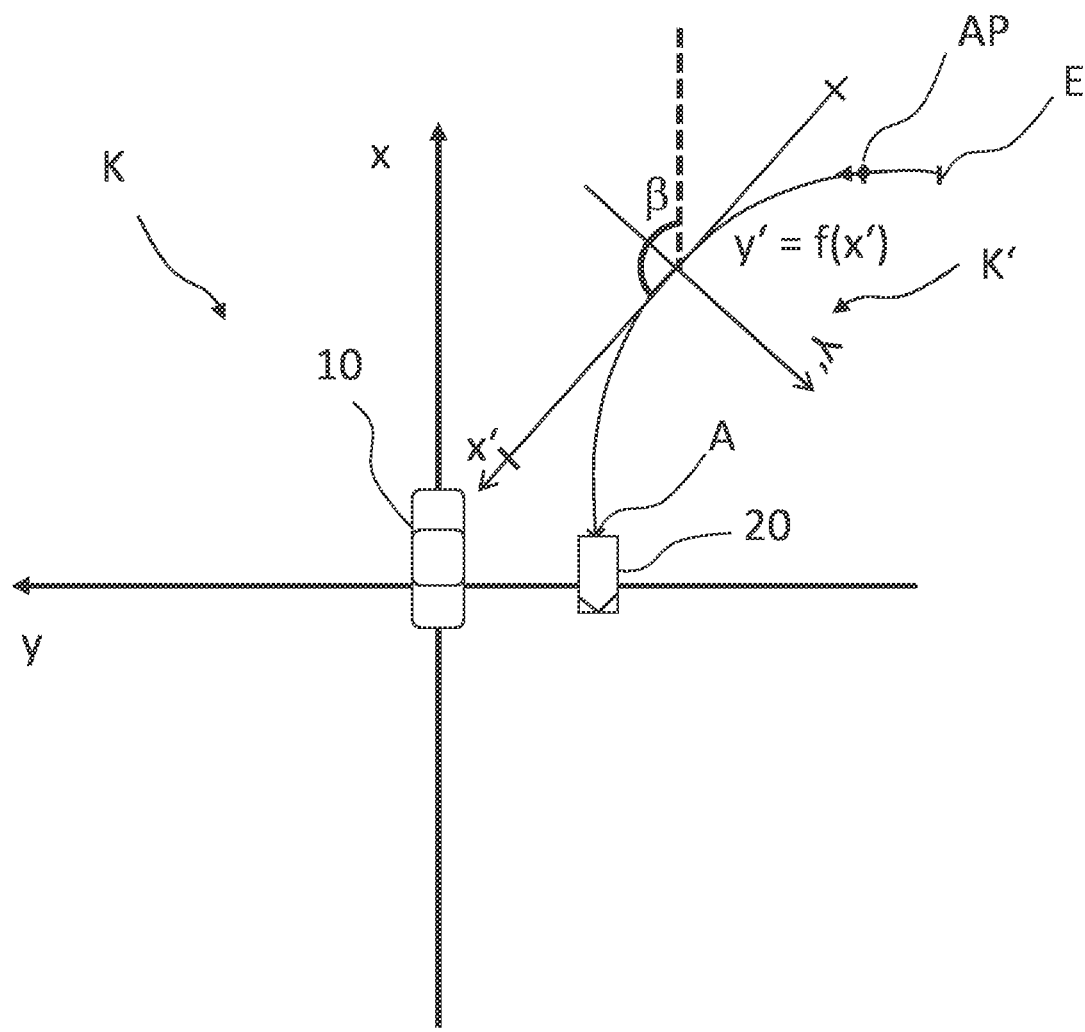

The calculation and transformation of the analytical curve characteristics at given measuring points is illustrated in FIG. 3c.

As soon as the curve is described analytically (here as a graph of a continuous function), analytical properties of the curve may be derived at certain points, such as a tangential angle $\Phi$, a curvature $\kappa$ or change of curvature $\kappa s$.

Since for the derivatives (with respect to the arc length) of the tangential angles $\Phi$, $\kappa$, $\kappa s$ the simple relationships apply $$\Phi = \Phi' - \beta \quad \text{Eq. (7)}$$

$$\kappa = \kappa' \quad \text{Eq. (8)}$$

$$\kappa S = \kappa S' \quad \text{Eq. (9)}$$

wherein $\Phi'$, $\kappa'$, $\kappa s'$ are the derivatives in the second coordinate system K', it is possible to calculate the values in the second coordinate system K' and then transform them back to the vehicle coordinate system K.

In the second coordinate system K' these quantities are determined by derivation of the polynomial function $y=f(x)$ at selected points $(x_0', y_0')$ according to the following equations:

$$\Phi'(x_0) = \arctan[f_x(x_0')] \quad \text{Eq. (10)}$$

$$\kappa'(x_0) = f_{xx}(x_0')/(1+f_x^2(x_0'))^{3/2} \quad \text{Eq. (12)}$$

$$\kappa s'(x_0) = f_{xxx}(x_0')/(1+f_x^2(x_0'))^2 - 3f_x(x_0')\kappa'^2(x_0') \quad \text{Eq. (13)}$$

Where $f_x$ is the first derivative, $f_{xx}$ is the second derivative, and $f_{xxx}$ is the third derivative of the function $f(x)$ with respect to x.

In a step S11 (see FIG. 2), the coordinates and the at least one analytical property of the respective sampling point are transformed into the vehicle coordinate system K and stored, for example, in a predetermined memory area.

Since the polynomial is represented in a separate coordinate system, i.e. in the second coordinate system K', the curve properties cannot be directly deduced to the respective corresponding point (x0, y0) in the vehicle coordinate system K.

Therefore, for example, a curve interface is provided that returns the curve characteristic at the sampling points AP, each of which is characterized by its arc length s. The end of the estimated section is set to s=0.

Since the arc length is invariant under a Euclidean transformation, the corresponding sample point may be determined directly in the second coordinate system K', that is, the specified value is used directly in the second coordinate system K' to deduce the corresponding sample point (x0', y0') on the curve.

The interface then provides the corresponding coordinates of the sampling point AP and the corresponding curve characteristics, for example by means of an array with 5 elements (x0, y0, $\Phi$, $\kappa$, $\kappa s$) for the respective sampling point AP, i.e. for the corresponding arc length.

In a step S13 the program may be terminated. Preferably, the program is run for a next set of sensed positions Pi. For example, the position of the object is measured again in a new cycle. This is added to the ring buffer as soon as the minimum distance to the previously stored measurement is reached, i.e $\lambda=1$. This new data set is then evaluated in a new program run.

LIST OF REFERENCE NUMERALS

10 Vehicle
20 Object
A Starting point
AP Sampling point
E Endpoint
K Vehicle coordinate system
K' Second coordinate system
Pi Sensed position
S1 . . . Program steps
S13

The invention claimed is:

1. A method of providing a path of an object for a vehicle, comprising:
   providing a predetermined first number of detected positions (Pi) of the object, wherein the detected positions (Pi) are provided with respect to a vehicle coordinate system (K) of the vehicle,
   determining a second, different, coordinate system (K') based on a predetermined second number of the provided positions among the predetermined first number of detected positions (Pi),
   transforming the provided positions into the second coordinate system (K') and determining a function which approximates a trajectory of the provided positions in the second coordinate system (K'),
   for a predetermined third number of sampling points of the function, determining at least one analytical property of the function at the respective sampling point;

transforming coordinates of the sampling points and the at least one analytical property of the respective sampling point into the vehicle coordinate system (K); and controlling the vehicle based on the coordinates of the sampling points and the at least one analytical property transformed into the vehicle coordinate system (K).

2. The method according to claim 1, wherein the positions are stored in a ring buffer.

3. The method according to claim 1, wherein directly successively sensed positions (Pi) have a minimum distance.

4. The method according to claim 3, wherein the minimum distance between the positions (Pi) sensed in direct succession is dependent on a current speed of the vehicle and/or a current yaw angle of the object and/or a curvature, determined for the current position of the object, of a previously determined trajectory which comprises the current position of the object.

5. The method according to claim 3, wherein the second coordinate system (K') is determined depending on a factor λ which is representative of a quotient of an actual distance between the two positions detected last in time from the third number of detected positions (Pi) and the minimum distance.

6. The method according to claim 1, wherein the course of the provided positions in the second coordinate system (K') is approximated by a polynomial with a degree of at least three.

7. The method according to claim 6, wherein respective polynomial coefficients of the polynomial are determined by means of a Kalman filtering.

8. The method according to claim 1, wherein:
the points of the function corresponding to the first detected position (Pi) and to the last detected position (Pi) form an end point (E) and a starting point (A), respectively, of a section of a trajectory of the function representing the course of the provided positions in the second coordinate system (K'),
the section is divided into a predetermined number of sampling points characterized by their arc length, and
a tangential angle and/or a curvature and/or a change in curvature is determined for the respective sampling point as the at least one analytical property of the function.

9. The method according to claim 8, in which a data set each is provided for a predetermined third number of sampling points, wherein the data set comprises the coordinates of the sampling point with respect to the vehicle coordinate system (K) and the at least one analytical property transformed into the vehicle coordinate system (K).

10. A device for providing a trajectory of an object for a vehicle, wherein the device is configured to perform a method according to claim 1.

11. A non-transitory, computer-readable medium comprising executable program code, wherein the program code, when executed by a data processing device, executes the method according to claim 1.

12. A non-transitory, computer-readable medium comprising executable program code, wherein the program code, when executed by a data processing device, executes the method according to claim 8.

* * * * *